(12) United States Patent
Huang et al.

(10) Patent No.: US 10,261,399 B2
(45) Date of Patent: Apr. 16, 2019

(54) PROJECTION SYSTEM

(71) Applicants:Huawei Technologies Co., Ltd., Shenzhen (CN); Cambridge Enterprise Limited, Cambridgeshire (GB)

(72) Inventors: Zhi Huang, Shenzhen (CN); Brian Robertson, Cambridge (GB); Daping Chu, Cambridge (GB)

(73) Assignees: Huawei Technologies Co., Ltd., Shenzhen (CN); Cambridge Enterprise Limited, Cambridgeshire (GB)

( * ) Notice: Subject to any disclaimer, the term of this patent is extended or adjusted under 35 U.S.C. 154(b) by 18 days.

(21) Appl. No.: 15/859,023

(22) Filed: Dec. 29, 2017

(65) Prior Publication Data

US 2018/0120676 A1    May 3, 2018

Related U.S. Application Data

(63) Continuation of application No. PCT/CN2015/083007, filed on Jun. 30, 2015.

(51) Int. Cl.
| | |
|---|---|
| *G03B 21/56* | (2006.01) |
| *H04N 9/31* | (2006.01) |
| *G03B 21/10* | (2006.01) |
| *G03B 21/28* | (2006.01) |
| *G03B 21/60* | (2014.01) |
| *G03B 21/13* | (2006.01) |

(52) U.S. Cl.
CPC ............. *G03B 21/10* (2013.01); *G03B 21/13* (2013.01); *G03B 21/28* (2013.01); *G03B 21/56* (2013.01); *G03B 21/60* (2013.01); *H04N 9/3147* (2013.01)

(58) Field of Classification Search
CPC ........ G03B 21/56; G03B 21/60; G03B 21/28; H04N 9/3147
USPC ............................................ 359/460; 353/78
See application file for complete search history.

(56) References Cited

U.S. PATENT DOCUMENTS

| 4,895,429 A | 1/1990 | Iwahara et al. |
| 5,085,495 A | 2/1992 | Iwahara et al. |

(Continued)

FOREIGN PATENT DOCUMENTS

| CN | 101556425 A | 10/2009 |
| CN | 101762965 A | 6/2010 |

(Continued)

*Primary Examiner* — Ryan D Howard
(74) *Attorney, Agent, or Firm* — Leydig, Voit & Mayer, Ltd.

(57) ABSTRACT

A projection system relates to the field of display technologies, and includes a projection unit, a screen unit, an outer frame, and a support structure component. The support structure component is configured to securely connect the screen unit to the outer frame. The support structure component is located on a light incident side of the screen unit. The support structure component includes a light transmission part and at least one connecting part. The light transmission part is securely connected to the screen unit. The light transmission part is configured to enable light rays emitted by the projection unit and irradiating the light transmission part to pass through. The at least one connecting part is located out of propagation paths of light rays emitted by the projection unit. The at least one connecting part is configured to securely connect the light transmission part to the outer frame.

10 Claims, 6 Drawing Sheets

(56) References Cited

U.S. PATENT DOCUMENTS

| | | | |
|---|---|---|---|
| 5,206,760 A | 4/1993 | Nakashima et al. | |
| 6,113,041 A | 9/2000 | Mannick | |
| 6,550,521 B1 | 4/2003 | McNabb | |
| 2002/0085278 A1 | 7/2002 | Kolosowsky | |
| 2010/0157256 A1* | 6/2010 | Itoh | G03B 21/10 353/78 |
| 2013/0057596 A1 | 3/2013 | Yanagita et al. | |
| 2014/0226133 A1 | 8/2014 | Nishimura | |
| 2016/0116829 A1* | 4/2016 | Itou | G03B 21/10 353/30 |

FOREIGN PATENT DOCUMENTS

| | | | |
|---|---|---|---|
| CN | 201876660 U | 6/2011 | |
| CN | 102822722 A | 12/2012 | |
| CN | 103489374 A | 1/2014 | |
| CN | 103700323 A | 4/2014 | |
| CN | 204375351 U | 6/2015 | |
| EP | 0471478 A2 | 2/1992 | |
| JP | H11249237 A | 9/1999 | |
| JP | WO 2014203387 A1 * | 12/2014 | G03B 21/10 |

\* cited by examiner

PROJECTION SYSTEM

CROSS-REFERENCE TO RELATED APPLICATIONS

This application is a continuation of International Application No. PCT/CN2015/083007, filed on Jun. 30, 2015, the disclosure of which is hereby incorporated by reference in its entirety.

TECHNICAL FIELD

The present disclosure relates to the field of projection technologies, and in particular, to a projection system.

BACKGROUND

With development of projection technologies, a resolution, a projection range, brightness, a contrast, and the like of a projection system on the market are gradually increased, while a price of the projection system is gradually reduced. A projection system with a resolution of 1080P has been widely used, and a 4K projection system has gradually become commercial. During current use, multiple screen units are usually spliced by using a projection array splicing method to obtain a large-size projection screen of tens of meters in length and width. There is an overlap area or a merged area at an edge connecting every two adjacent screen units. To provide better visual experience for viewers, a non-transparent mechanical structure used for supporting the projection screen needs to be kept away as much as possible during display of the projection system, so as to avoid producing a shadow on the screen or blocking the screen.

Currently, how to reduce impact, on an image, of a shadow or screen blocking caused by a support structure component during projection of a projection system to improve image projection quality of the projection system is a technical problem that needs to be urgently resolved.

SUMMARY

The present disclosure provides a projection system, and the projection system can improve display quality of an image when the projection system performs projection.

According to a first aspect, a projection system is provided, including a projection unit, a screen unit, an outer frame, and a support structure component, where the screen unit is configured to display a picture projected by the projection unit, the outer frame is configured to fasten the projection unit and the support structure component, the support structure component is configured to securely connect the screen unit to the outer frame, and the support structure component is located on a light incident side of the screen unit;

the support structure component includes a light transmission part and at least one connecting part, where the light transmission part is securely connected to the screen unit, and the light transmission part is configured to enable light rays emitted by the projection unit and irradiating the light transmission part to pass through; and the at least one connecting part is located out of propagation paths of light rays emitted by the projection unit, and the at least one connecting part is configured to securely connect the light transmission part to the outer frame.

With reference to the first aspect, in a first possible implementation, a distance between a point on an inner curved surface of the light transmission part and an optical axis of the projection unit gradually increases along a reverse projection direction, a distance between a point on an outer curved surface of the light transmission part and the optical axis of the projection unit gradually increases along the reverse projection direction, the reverse projection direction is a direction in which the screen unit points to the projection unit, the inner curved surface is a surface on a side, facing the optical axis of the projection unit, of the light transmission part, and the outer curved surface is a surface on a side, not facing the optical axis of the projection unit, of the light transmission part.

With reference to the first possible implementation of the first aspect, in a second possible implementation, smooth transition is implemented between the inner curved surface and a light incident surface of the screen unit, and smooth transition is implemented between the outer curved surface and the light incident surface, so that the light rays passing through the light transmission part are evenly distributed when irradiating the light incident surface of the screen unit.

With reference to the first possible implementation or the second possible implementation of the first aspect, in a third possible implementation, a point that is on the inner curved surface or the outer curved surface and that is farthest from the optical axis is an edge point, and a minimum length value $h_{min}$ between the edge point and the screen unit meets the following formula:

$$h_{min} = \left(\frac{b}{2}\right) * \frac{1}{\tan(\theta_{max})},$$

where b is a width of a merged area in the projection system, and $\theta_{max}$ is a maximum included angle between the light rays emitted by the projection unit and the optical axis of the projection unit.

With reference to any one of the first possible implementation, the second possible implementation, or the third possible implementation of the first aspect, in a fourth possible implementation, in a coordinate system that uses an intersection point of the optical axis of the projection unit and the screen unit as an origin, uses the light incident surface of the screen unit as a plane on which an x-axis and a y-axis are located, uses the optical axis as a z-axis, and uses a direction of the z-axis as the direction in which the screen unit points to the projection unit, a function of the inner curved surface meets the following formula:

$$\begin{cases} h_1 = \alpha_1(r - r_1)^{Q_1}; r > r_1 \\ h_1(r) = 0; r \leq r_1 \end{cases},$$

where $\alpha_1$ and $Q_1$ are optimization coefficients, $r_1$ is a radius of a circle in which an intersection line of the inner curved surface and the light incident surface is located, r is a distance between any one point on the inner curved surface and the optical axis of the projection unit, and $h_1$ is a distance between the any one point and the light incident surface of the screen unit; and a function of the outer curved surface meets the following formula:

$$\begin{cases} h_2 = \alpha_2(r - r_2)^{Q_2}; r > r_2 \\ h_2 = 0; r \leq r_2 \end{cases},$$

where $\alpha_2$ and $Q_2$ are optimization coefficients, $r_2$ is a radius of a circle in which an intersection line of the outer curved surface and the light incident surface is located, r is a distance between any one point on the outer curved surface and the optical axis of the projection unit, and $h_2$ is a distance between the any one point and the light incident surface of the screen unit.

With reference to any one of the first possible implementation, the second possible implementation, the third possible implementation, or the fourth possible implementation of the first aspect, in a fifth possible implementation, in a coordinate system that uses an intersection point of the optical axis of the projection unit and the screen unit as an origin, uses the light incident surface of the screen unit as a plane on which an x-axis and a y-axis are located, uses the optical axis as a z-axis, and uses a direction of the z-axis as the direction in which the screen unit points to the projection unit, a function of the inner curved surface meets the following formula:

$$h_1 = \sum_{n=0}^{N} \alpha_n r^n,$$

where $\alpha_n$ and N are optimization coefficients, r is a distance between any one point on the inner curved surface and the optical axis of the projection unit, and $h_1$ is a distance between the any one point and the light incident surface of the screen unit; and a function of the outer curved surface meets the following formula:

$$h_2 = \sum_{n=0}^{M} \beta_n r^n,$$

where $\beta_n$ and M are optimization coefficients, r is a distance between any one point on the outer curved surface and the optical axis of the projection unit, and $h_2$ is a distance between the any one point and the light incident surface of the screen unit.

With reference to any one of the first aspect, or the first possible implementation, the second possible implementation, the third possible implementation, the fourth possible implementation, or the fifth possible implementation of the first aspect, in a sixth possible implementation, the light transmission part is attached to the screen unit, a surface on which the light transmission part is attached to the screen unit is an attaching surface, an area in which the screen unit is attached to the attaching surface does not overlap with an edge area of the screen unit, and the edge area is a partial area of the merged area of the projection system.

With reference to any one of the first aspect, or the first possible implementation, the second possible implementation, the third possible implementation, the fourth possible implementation, the fifth possible implementation, or the six possible implementation of the first aspect, in a seventh possible implementation, the projection unit includes a projector, a first reflector plate, and a second reflector plate, where the first reflector plate is configured to reflect, to the second reflector plate, light rays emitted by the projector, and the second reflector plate is configured to reflect, to the screen unit, the light rays reflected by the first reflector plate.

With reference to any one of the first aspect, or the first possible implementation, the second possible implementation, the third possible implementation, the fourth possible implementation, the fifth possible implementation, the six possible implementation, or the seventh possible implementation of the first aspect, in an eighth possible implementation, a material for fabricating the light transmission part includes acrylic plastic or polystyrene plastic, and a material for fabricating the connecting part includes acrylic plastic or polystyrene plastic.

With reference to any one of the first aspect, or the first possible implementation, the second possible implementation, the third possible implementation, the fourth possible implementation, the fifth possible implementation, the six possible implementation, the seventh possible implementation, or the eight possible implementation of the first aspect, in a ninth possible implementation, the screen unit is a flat-surface screen unit or a curved-surface screen unit.

According to the technical solutions provided in embodiments of the present disclosure, among the light rays emitted by the projection unit, the light rays irradiating the light transmission part of the support structure component can pass through the light transmission part and be projected onto the screen unit. The light transmission part does not block the light rays emitted by the projection unit. In addition, the connecting part of the support structure component is located out of the paths along which the light rays emitted by the projection unit travel during propagation, and also does not block the light rays emitted by the projection unit. Therefore, the support structure component of the screen unit does not block the light rays emitted by the projection unit, and this further reduces a shadow formed by the projection system on an image during image display, so that the projection system has better display quality.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

Figure 1:
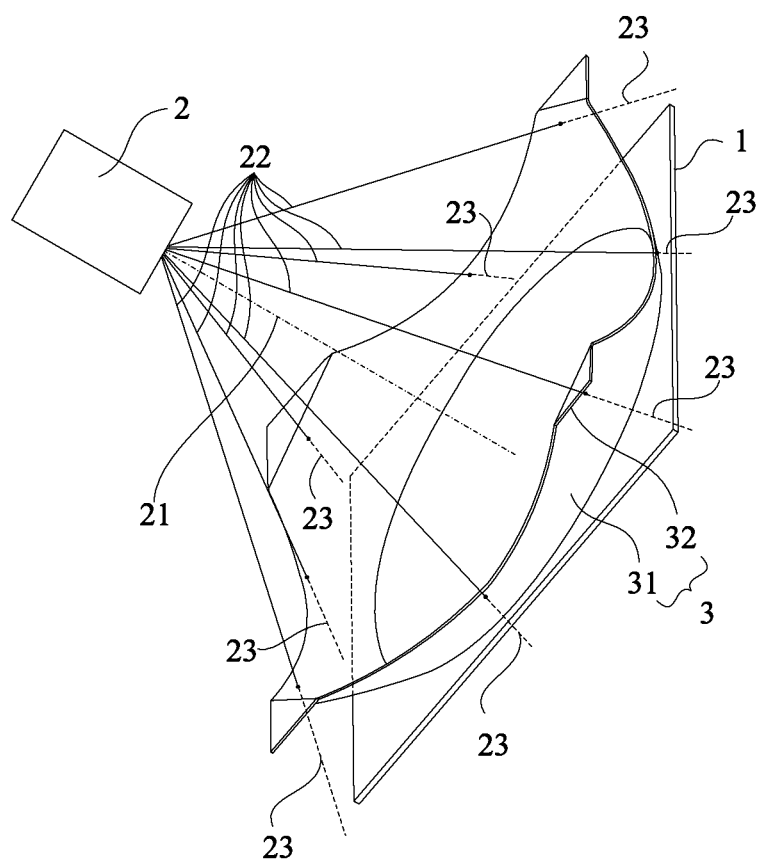
FIG. 1 is a schematic structural diagram of a principle of a projection system according to an embodiment of the present disclosure.
Figure 7:
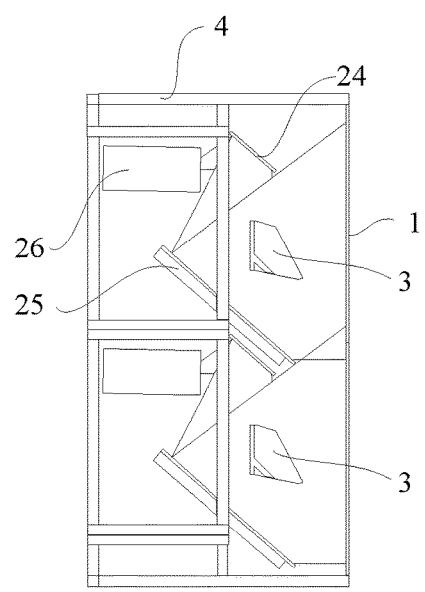
FIG. 7 is a schematic structural diagram of a principle of a projection system according to another embodiment of the present disclosure.

Referring to FIG. 1 and FIG. 7, an embodiment of the present disclosure provides a projection system, including an outer frame 4 and multiple display units. Each display unit includes a screen unit 1, a projection unit 2, and a support structure component 3. The screen unit 1 is configured to display a picture projected by the projection unit 2. The outer frame 4 is configured to fasten the projection unit 2 and the support structure component 3. The support structure component 3 is configured to securely connect the screen unit 1 to the outer frame 4, and the support structure component 3 is located on a light incident side of the screen unit 1.

The support structure component 3 includes a light transmission part 31 and at least one connecting part 32. The light transmission part 31 is configured to securely connect to the screen unit 1, and the light transmission part 31 is configured to enable light rays emitted by the projection unit 2 and irradiating the light transmission part 31 to pass through, so that the light rays emitted by the projection unit 2 and irradiating the light transmission part 31 are projected onto the screen unit 1.

The at least one connecting part 32 is located out of propagation paths of light rays emitted by the projection unit 2, so that the light rays emitted by the projection unit 2 do not travel around the at least one connecting part 32. The at least one connecting part 32 is configured to securely connect the light transmission part 31 to the outer frame 4.

In the projection system, the projection unit 2 is configured to emit light rays of a projection picture to be projected by the projection system. The light rays irradiate the screen unit 1 from a side, not facing a viewer, of the screen unit 1, and then the light rays pass through the screen unit 1 and then irradiate a side, facing a viewer, of the screen unit 1. Therefore, the light incident side of the screen unit 1 is a side, facing the projection unit 2, of the screen unit 1, and a light incident surface of the screen unit 1 is a surface on the side, facing the projection unit 2, of the screen unit 1. The propagation paths of the light rays emitted by the projection unit 2 are paths along which the light rays emitted by the projection unit 2 travel during propagation.

In the projection system, the screen units 1 in the display units are spliced with each other, to form a display screen of the projection system, and an edge area between every two adjacent screen units 1 forms a merged area when the two screen units 1 are spliced, as shown in an area A depicted in FIG. 1. In each display unit, among the light rays emitted by the projection unit 2, the light rays irradiating the light transmission part 31 of the support structure component 3 can pass through the light transmission part 31 and be projected onto the screen unit 1. The light transmission part 31 does not block the light rays emitted by the projection unit 2. In addition, the connecting part 32 of the support structure component 3 is located out of the paths along which the light rays emitted by the projection unit 2 travel during propagation, and also does not block the light rays emitted by the projection unit 2. Therefore, the support structure component 3 of the screen unit 1 does not block the light rays emitted by the projection unit 2, and this further reduces a shadow formed by the projection system on an image during image display, so that the projection system has better display quality.

Figure 2:
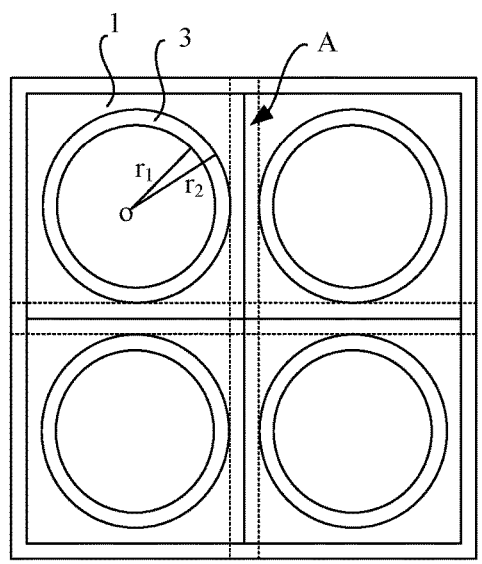
FIG. 2 is a schematic structural diagram of cooperation between a support structure component and a screen unit of the projection system shown in FIG. 1.
Figure 3:
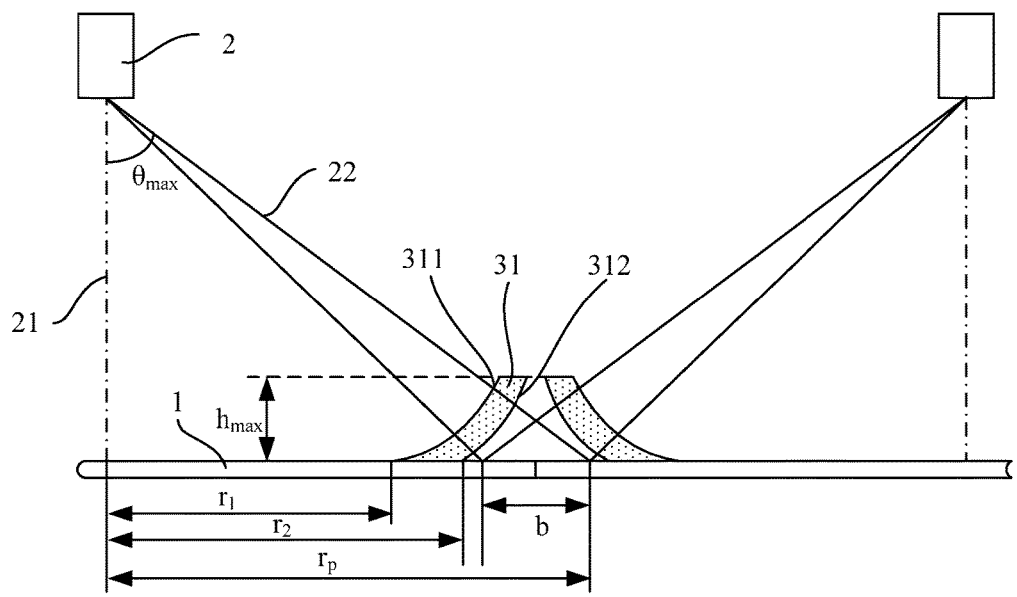
FIG. 3 is a schematic diagram of a principle of cooperation between a light transmission part of a support structure component, a projection unit, and a screen unit in a projection system according to an embodiment of the present disclosure.
Figure 4:
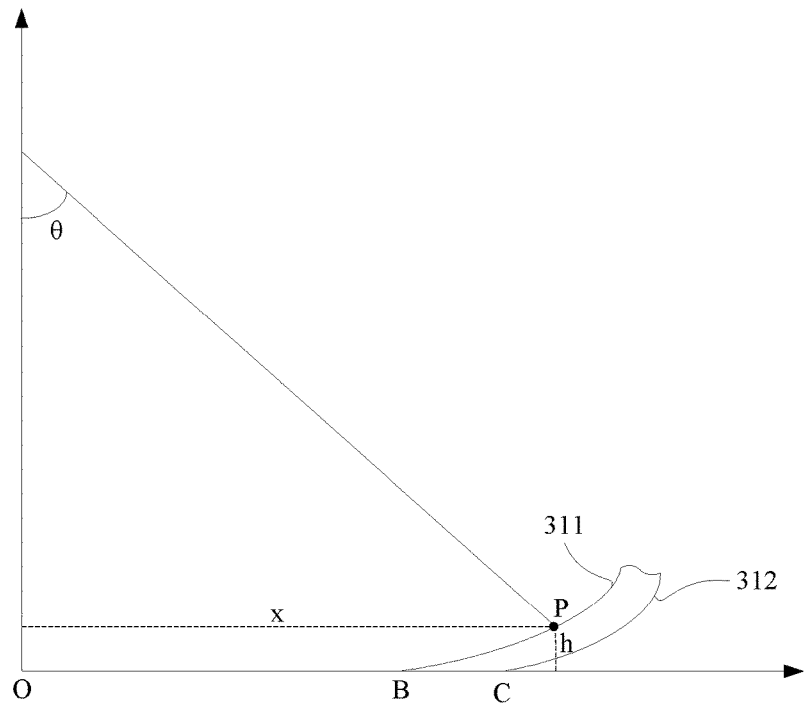
FIG. 4 is a schematic diagram of a surface function of a light transmission part of a support structure component in a projection system according to an embodiment of the present disclosure.

In a implementation, as shown in FIG. 2, FIG. 3, and FIG. 4, a surface on a side, facing an optical axis 21 of the projection unit 2, of the light transmission part 31 is an inner curved surface 311, and a surface on a side, not facing an optical axis 21 of the projection unit 2, of the light transmission part 31 is an outer curved surface 312. A distance between a point on the inner curved surface 311 of the light transmission part 31 and the optical axis 21 of the projection unit 2 gradually increases along a reverse projection direction, and a distance between a point on the outer curved surface 312 of the light transmission part 31 and the optical axis 21 of the projection unit 2 gradually increases along the reverse projection direction. The reverse projection direction is a direction in which the screen unit 1 points to the projection unit 2.

as shown in FIG. 2 and FIG. 3, to reduce a shadow that is formed on the screen unit 1 due to refraction of the light rays by the light transmission part 31 of the support structure component 3 during display of the projection system, as shown in FIG. 2, FIG. 3, and FIG. 4, in the projection system, a derivative of a location at which the inner curved surface 311 of the light transmission part 31 and the light incident surface of the screen unit 1 intersect is zero, that is, smooth transition is implemented between the inner curved surface 311 of the light transmission part 31 and the light incident surface of the screen unit 1, and a derivative of a location at which the outer curved surface 312 of the light transmission part 31 and the light incident surface of the screen unit 1 intersect is zero, that is, smooth transition is implemented between the outer curved surface 312 of the light transmission part 31 and the light incident surface of the screen unit 1. Smooth transition is implemented between the inner curved surface 311 of the light transmission part 31 and the light incident surface of the screen unit 1, and smooth transition is also implemented between the outer curved surface 312 of the light transmission part 31 and the light incident surface of the screen unit 1. Therefore, among the light rays emitted by the projection unit 2, the light rays passing through the light transmission part 31 do not form a spotlight point when irradiating the light incident surface of the screen unit 1; instead, the light rays emitted by the projection unit 2 and passing through the light transmission part 31 are evenly distributed when irradiating the light incident surface of the screen unit 1. This further reduces the shadow that is formed on the screen unit 1 due to the refraction of the light rays by the light transmission part 31 of the support structure component 3 during display of the projection system.

In an implementation, to ensure that the light rays emitted by the projection unit 2 pass through the light transmission part 31 when irradiating a location in which the light transmission part 31 of the support structure component 3 is located, and that the connecting part 32 of the support structure component 3 does not block the light rays emitted by the projection unit 2, as shown in FIG. 3, the light transmission part 31 and the projection unit 2 corresponding to the light transmission part 31 meet the following conditions.

A point that is on the inner curved surface 311 or the outer curved surface 312 and that is farthest from the optical axis 21 is an edge point, and a minimum length value $h_{min}$ between the edge point and the screen unit 1 meets the following formula:

$$h_{min} = \left(\frac{b}{2}\right) * \frac{1}{\tan(\theta_{max})},$$

where b is a width of a merged area in the projection system, and $\theta_{max}$ is a maximum included angle between the light rays emitted by the projection unit and the optical axis of the projection unit.

Figure 5:
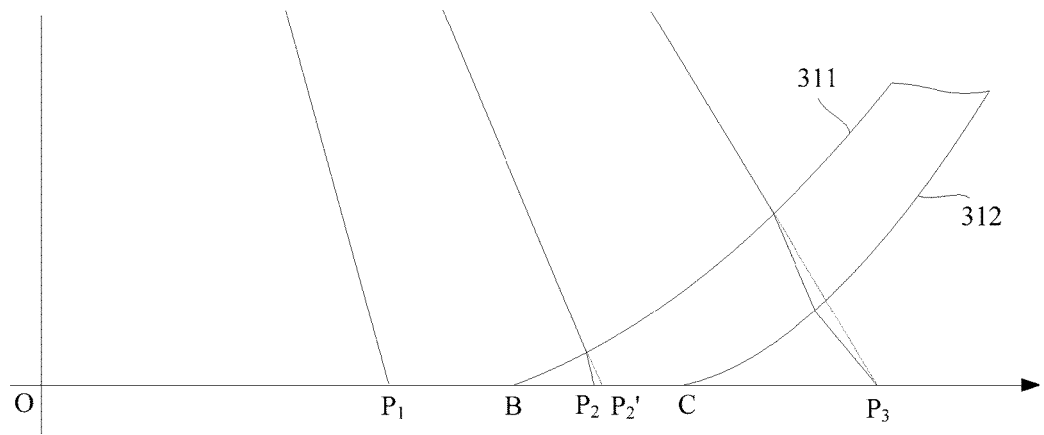
FIG. 5 is a schematic diagram of a principle of an optical path when light rays emitted by a projection unit in a projection system irradiate a screen unit according to an embodiment of the present disclosure.

As shown in FIG. 5, among the support structure component 3, the screen unit 1, and the projection unit 2 of one display unit, the light rays emitted by the projection unit 2 are divided into the following three parts.

For a first part, for example, a part irradiating an OB area shown in FIG. 5, this part of light rays that is of the light rays emitted by the projection unit 2 and that irradiates the OB area directly reaches the screen unit 1 without passing through the light transmission part 31, and therefore, there is not any deformation.

For a second part, for example, a part irradiating a BC area shown in FIG. 5, this part of light rays needs to be reflected once to reach a P2, and therefore, it is inevitable that the P2 is different from a location P2' at which the light rays reach the screen when no transparent support structure is used. Therefore, inverse distortion needs to be generated by using a software-based correction method before projection, to counteract distortion caused by refraction.

For a third part, for example, a part irradiating an area extending from C in a direction leaving O, as shown in FIG. 5, this part of light rays needs to successively pass through a surface, facing the optical axis 21, of the light transmission part 31 and a surface, not facing the optical axis 21, of the light transmission part 31. Therefore, this part of light rays is refracted twice and then irradiates a point P3.

Therefore, in the projection system, to control an amount of distortion that is of the light rays of the projection unit 2 and that is generated after passing through the light transmission part 31 of the support structure component 3, the inner curved surface 311 and the outer curved surface 312 of the light transmission part 31 need to be optimized during design of the light transmission part 31.

In a implementation, an exponential equation is used to optimize shapes of the inner curved surface 311 and the outer curved surface 312 of the light transmission part 31, in a coordinate system that uses an intersection point of the optical axis 21 of the projection unit 2 and the screen unit 1 as an origin, uses the light incident surface of the screen unit 1 as a plane on which an x-axis and a y-axis are located, uses the optical axis 21 as a z-axis, and uses a direction of the z-axis as the direction in which the screen unit 1 points to the projection unit 2, a function of the inner curved surface 311 meets the following formula:

$$\begin{cases} h_1 = \alpha_1(r - r_1)^{Q_1}; r > r_1 \\ h_1(r) = 0; r \le r_1 \end{cases},$$

where $\alpha_1$ and $Q_1$ are optimization coefficients, $r_1$ is a radius of a circle in which an intersection line of the inner curved surface 311 and the light incident surface is located, r is a distance between any one point on the inner curved surface 311 and the optical axis 21 of the projection unit 2, and $h_1$ is a distance between the any one point and the light incident surface of the screen unit 1; and a function of the outer curved surface 312 meets the following formula:

$$\begin{cases} h_2 = \alpha_2(r - r_2)^{Q_2}; r > r_2 \\ h_2 = 0; r \le r_2 \end{cases},$$

where $\alpha_2$ and $Q_2$ are optimization coefficients, $r_2$ is a radius of a circle in which an intersection line of the outer curved surface 312 and the light incident surface is located, r is a distance between any one point on the outer curved surface 312 and the optical axis 21 of the projection unit 2, and $h_2$ is a distance between the any one point and the light incident surface of the screen unit 1.

In a specific implementation, when the light transmission part 31 of the support structure component 3 is of an axisymmetric structure whose symmetry axis coincides with the optical axis 21 of the projection unit 2, as shown in FIG. 3:

dimensions of the screen unit 1 are $x_s = y_s = 965$ mm;

a distance $z_p$, along the optical axis 21, between a lens of the projection unit 2 and the light incident surface of the screen unit 1 is equal to 792 mm;

a projection area of the projection unit 2 on a plane on which the light incident surface of the screen unit 1 is located is $x_p = y_p = 1045$ mm;

a width b of a merged area A after every two adjacent screen units 1 are spliced is equal to 80 mm;

a maximum height $h_{max}$ of the light transmission part 31 along an extended direction of a symmetry axis of the light transmission part 31 is greater than or equal to 60.6 mm;

a diameter Δ of a projection pixel in the projection unit 2 is equal to 0.54 mm; and in the support structure component 3:
the radius $r_1$ of the circle in which the intersection line of the inner curved surface 311 of the light transmission part 31 and the light incident surface of the screen unit 1 is located is equal to 400 mm;

the radius $r_2$ of the circle in which the intersection line of the outer curved surface 312 of the light transmission part 31 and the light incident surface of the screen unit 1 is located is equal to 410 mm;

$a_1 = a_2 = 3.5$; and
$Q_1 = Q_2 = 1.5$.

Figure 6:
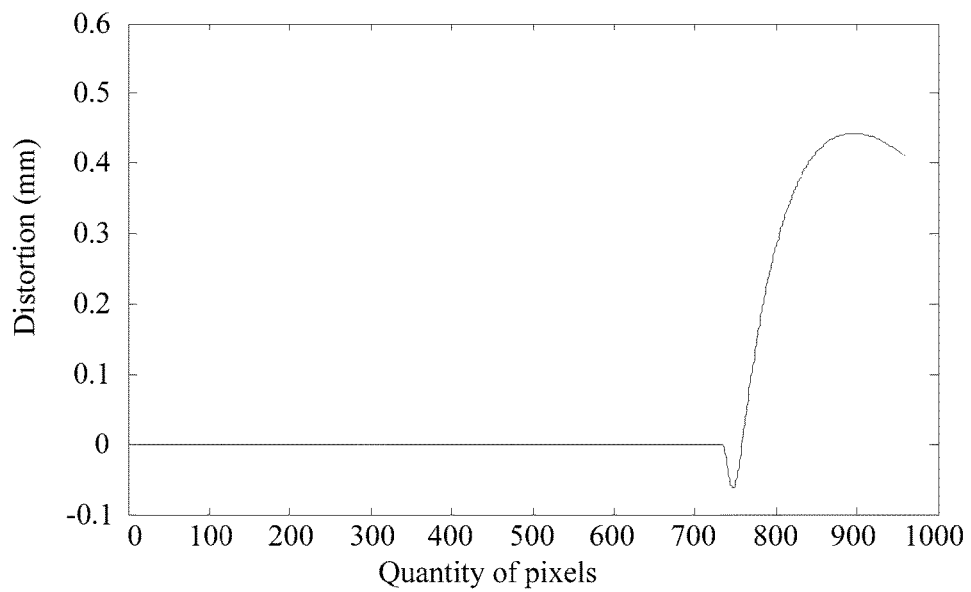
FIG. 6 is a schematic diagram of an amount of distortion after the projection unit and a support structure component in the projection system shown in FIG. 5 are optimized.

In the projection system of the foregoing structure, a change of distortion from a center of the screen unit 1 to an edge is shown in FIG. 6. A horizontal coordinate is a radial coordinate using the center of the screen unit 1 as an origin, and a vertical coordinate is a difference, in a unit of pixel, between a location at which a same light ray reaches the screen unit 1 when no light transmission part 31 is disposed and that when the light transmission part 31 is disposed. It can be learned from FIG. 6 that, the amount of distortion is zero when the light rays of the projection unit 2 irradiate the screen unit 1 in the OB area shown in FIG. 6. For the light rays irradiating the BC area, there is a relatively small amount of negative distortion, for example, 0.06 mm shown in FIG. 6, that is less than one tenth of a pixel diameter value. For the light rays irradiating the area extending from C in the direction leaving O, there is an amount of positive distortion whose maximum value is 0.44 mm, and this value is also less than a projection pixel diameter 0.54 mm; therefore, the amount of distortion is very small, and the amount of distortion begins to decline.

When the support structure component 3, the screen unit 1, and the projection unit 2 of the projection system meet the foregoing parameters, the amount of distortion generated when the light rays emitted by the projection unit irradiate the screen unit 1 is so small that cannot be sensed by human eyes. Therefore, the projection system has relatively high display quality.

In another specific implementation, for a support structure component 3, a corresponding screen unit 1, and a corresponding projection unit 2 of each display unit:

dimensions of the screen unit 1 are $x_s$=1154 mm and $y_s$=515 mm;

a width b of a merged area after every two adjacent screen units 1 are spliced is equal to 80 mm;

a maximum height $h_{max}$ of the light transmission part 31 along an extended direction of a symmetry axis of the light transmission part 31 is greater than or equal to 70 mm;

offset=22 mm; and in each support body of the support structure component 3:

a radius $r_1$ of a circle in which an intersection line of a surface on a side, facing the optical axis 21 of the projection unit 2, of the light transmission part 31 and the screen unit 1 is located is equal to 400 mm;

a radius $r_2$ of a circle in which an intersection line of a surface on a side, not facing the optical axis 21 of the projection unit 2, of the light transmission part 31 and the screen unit 1 is located is equal to 410 mm;

a maximum diameter $r_m$ corresponding to projection that is of the surface on the side, not facing the optical axis 21, of the light transmission part 31 and that is on the light incident surface of the screen unit 1 is equal to 550 mm;

an included angle β between a cutting center line of each light transmission part 31 and a horizontal line is equal to 33.2°;

a radian 2Δβ of the light transmission part 31 is equal to 14.25°;

$a_1=a_2=3.9$; and $Q_1=Q_2=1.48$.

Figure 9:
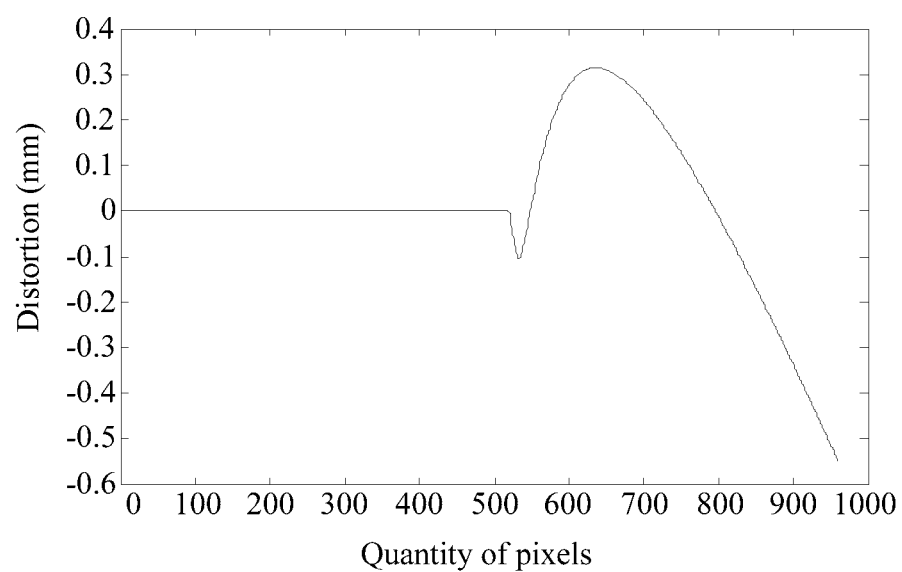
FIG. 9 is a schematic diagram of an amount of distortion after a projection unit and a support structure component in a projection system are optimized according to an embodiment of the present disclosure.

As shown in FIG. 9, when parameters of each group of a corresponding support structure component 3, a corresponding screen unit 1, and a corresponding projection unit 2 of the projection system are recorded as the foregoing, a maximum amount of distortion when light rays emitted by the projection unit 2 irradiate the screen unit 1 is about 0.6 mm, approximates to a diameter of one projection pixel. This can basically meet a non-distortion design requirement of the projection system, and can reduce a weight of the support structure component 3 and further reduce a weight of the entire projection system.

Certainly, a method of obtaining a sum of polynomials may alternatively be used to optimize the shapes of the inner curved surface 311 and the outer curved surface 312 of the light transmission part 31:

in a coordinate system that uses an intersection point of the optical axis 21 of the projection unit 2 and the screen unit 1 as an origin, uses the light incident surface of the screen unit 1 as a plane on which an x-axis and a y-axis are located, uses the optical axis 21 of the projection unit 2 as a z-axis, and uses a direction of the z-axis as the direction in which the screen unit 1 points to the projection unit 2, a function of the inner curved surface 311 of the light transmission part 31 meets the following formula:

$$h_1 = \sum_{n=0}^{N} \alpha_n r^n,$$

where $\alpha_n$ and N are optimization coefficients, r is a distance between any one point on the inner curved surface 311 and the optical axis 21 of the projection unit 2, and $h_1$ is a distance between the any one point and the light incident surface of the screen unit 1; and a function of the outer curved surface 312 of the light transmission part 31 meets the following formula:

$$h_2 = \sum_{n=0}^{M} \beta_n r^n,$$

where $\beta_n$ and M are optimization coefficients, r is a distance between any one point on the outer curved surface 312 and the optical axis 21 of the projection unit 2, and $h_2$ is a distance between the any one point and the light incident surface of the screen unit 1.

In the projection system, the support structure component 3 may be disposed in different manners.

In a first manner, the support structure component 3 includes a light transmission part. The light transmission part 31 is of an axisymmetric structure, and a symmetry axis of the light transmission part 31 coincides with the optical axis 21 of the projection unit 2, as shown in FIG. 1. In this case, multiple connecting parts 32 may be disposed on the support structure component 3, as shown in FIG. 1, there may be four connecting parts 32 in each support structure component 3, and the four connecting parts 32 are evenly distributed along a circumferential direction of the optical axis 21.

Figure 8:
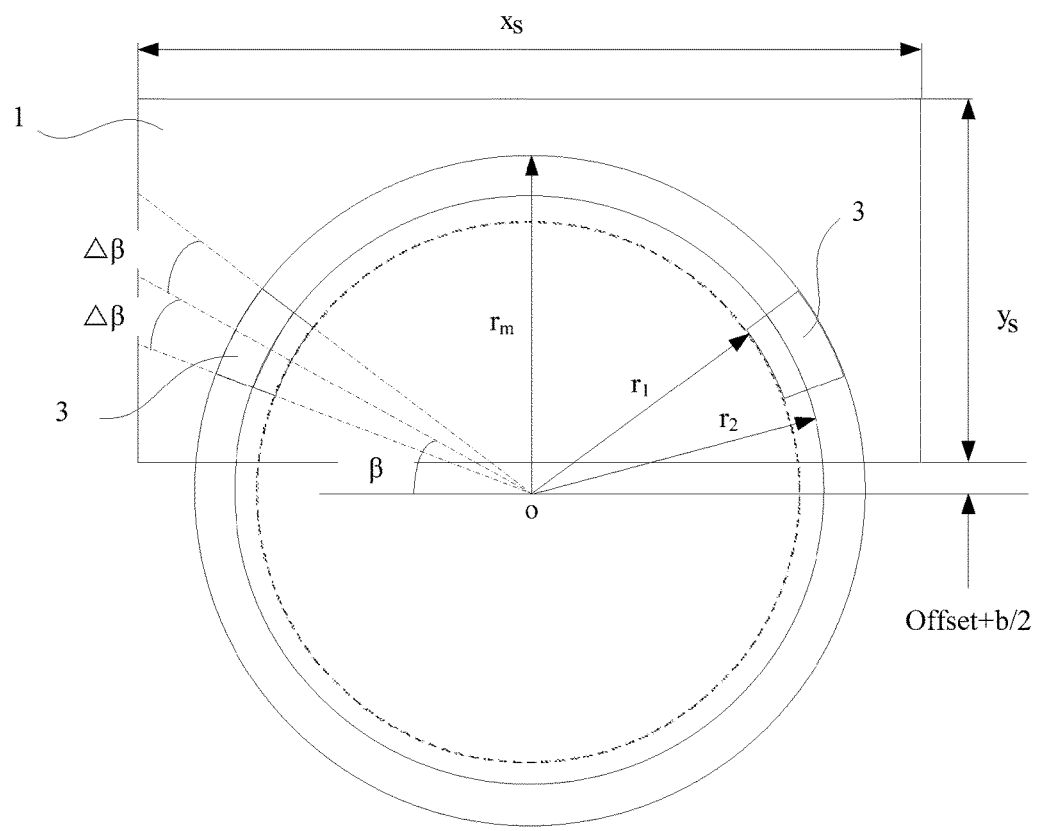
FIG. 8 is a schematic structural diagram of cooperation between a projection unit, a support structure component, and a screen unit in a projection system of a structure shown in FIG. 7.

In a second manner, as shown in FIG. 7 and FIG. 8, the support structure component 3 may alternatively include two light transmission parts 31, and each light transmission part 31 may be a part cut from a whole body of the axisymmetric structure disclosed in the first manner. One connecting part 32 is disposed on each of the two light transmission parts 31. The support structure component 3 can reduce a weight of the support structure component 3, and further reduce a weight of the entire projection system.

Certainly, the projection unit 2 in the projection system can also be disposed in various manners, and details are as follows.

In a first manner, as shown in FIG. 1 and FIG. 3, for each support structure component 3, a corresponding screen unit 1, and a corresponding projection unit 2:

the projection unit 2 may include only one projector, the projector is mounted on the outer frame 4, and the optical axis 21 that is of the projector and that emits light rays coincides with the symmetry axis of the light transmission part 31.

In a second manner, as shown in FIG. 7, for each support structure component 3, a corresponding screen unit 1, and a corresponding projection unit 2:

the projection unit 2 includes one projector 26, one first reflector plate 24, and one second reflection sheet 25, where the projector 26 is mounted on the outer frame 4; the first reflector plate 24 is mounted on the outer frame 4 and configured to reflect, to the second reflector plate 25, all light rays emitted by the projector 26; and the second reflector plate 25 is mounted on the outer frame 4 and configured to reflect, to the screen unit 1 corresponding to the projection unit 2, all the light rays reflected by the first reflector plate 24.

When the structure in the second manner is used for the projection unit 2, a method of multiple reflections by the first reflector plate 24 and the second reflector plate 25 can be used to shorten a projection distance of the projection unit 2, and further reduce a thickness in a direction in which the entire projection system is vertical to the screen unit 1.

Certainly, in the projection system, each screen unit needs to be seamlessly spliced with another screen unit for use, and each screen unit is independent when the projection system operates. Therefore, for each support structure component 3, the corresponding screen unit 1, and the corresponding projection unit 2, during assembly of the support structure component 3 and the projection unit 2, it is also necessary to ensure that light rays emitted by each projection unit 2 can pass through only the light transmission part 31 of the support structure component 3 corresponding to the projection unit, but cannot reach a light transmission part of a support structure component that is corresponding to another screen unit adjacent to the screen unit 1.

Certainly, in another implementation, as shown in FIG. 8, when a support structure component 3 is the support structure component 3 disclosed in the second manner, for each support structure component 3, a corresponding screen unit 1, and a corresponding projection unit 2:

an light incident surface of the screen unit 1 is of a rectangular structure;

an intersection point between an optical axis 21 of the projection unit 2 and a plane on which the light incident surface of the screen unit 1 is located is on a straight line on which a center line parallel to a short side of the screen unit 1 is located, and is on the outside of the screen unit 1, and an off-axis height corresponding to the screen unit 1 is an offset +b/2, where the offset is a distance from the intersection point between the optical axis of the projection unit and the plane on which the light incident surface of the screen unit is located to an image formed by the projection unit on the light incident surface of the screen unit; and b is a width of a merged area after every two adjacent screen units are spliced; and the two light transmission parts 31 included in each support structure component 3 are symmetrically disposed along the center line parallel to the short side of the screen unit 1.

Preferably, the screen unit 1 may be a flat-surface screen unit, or may be a curved-surface screen unit.

In a implementation, a material for fabricating the light transmission part 31 may be acrylic plastic or a PS material. A material for fabricating the connecting part 32 may be acrylic plastic or a PS material. The acrylic plastic and the PS material are transparent plastic with a low light absorptivity and a low chromatic dispersion coefficient. These materials should also feature applicability for mold making, low costs, and the like, and can also enhance a structural strength of the support structure component 3.

Obviously, a person of ordinary skill in the art can make various modifications and variations to embodiments of the present disclosure without departing from the spirit and scope of the present disclosure. The present disclosure is intended to cover these modifications and variations provided that they fall within the scope of protection defined by the following claims and their equivalent technologies.

What is claimed is:

1. A projection system, comprising a projection unit, a screen unit, an outer frame, and a support structure component, wherein the screen unit is configured to display a picture projected by the projection unit, the outer frame is configured to fasten the projection unit and the support structure component, the support structure component is configured to securely connect the screen unit to the outer frame, and the support structure component is located on a light incident side of the screen unit;

the support structure component comprises a light transmission part and at least one connecting part, wherein the light transmission part is securely connected to the screen unit, and the light transmission part is configured to enable light rays emitted by the projection unit and irradiating the light transmission part to pass through; and the at least one connecting part is located out of propagation paths of light rays emitted by the projection unit, and the at least one connecting part is configured to securely connect the light transmission part to the outer frame.

2. The projection system according to claim 1, wherein a distance between a point on an inner curved surface of the light transmission part and an optical axis of the projection unit gradually increases along a reverse projection direction, a distance between a point on an outer curved surface of the light transmission part and the optical axis of the projection unit gradually increases along the reverse projection direction, the reverse projection direction is a direction in which the screen unit points to the projection unit, the inner curved surface is a surface on a side, facing the optical axis of the projection unit, of the light transmission part, and the outer curved surface is a surface on a side, not facing the optical axis of the projection unit, of the light transmission part.

3. The projection system according to claim 2, wherein a smooth transition exists between the inner curved surface and a light incident surface of the screen unit, and a smooth transition exists between the outer curved surface and the light incident surface, so that the light rays passing through the light transmission part are evenly distributed when irradiating the light incident surface of the screen unit.

4. The projection system according to claim 2, wherein a point that is on the inner curved surface or the outer curved surface and that is farthest from the optical axis is an edge point, and a minimum length value $h_{min}$ between the edge point and the screen unit satisfies the following formula:

$$h_{min} = \left(\frac{b}{2}\right) * \frac{1}{\tan(\theta_{max})},$$

wherein b is a width of a merged area in the projection system, and $\theta_{max}$ is a maximum included angle between the light rays emitted by the projection unit and the optical axis of the projection unit.

5. The projection system according to claim 2, wherein in a coordinate system that uses an intersection point of the optical axis of the projection unit and the screen unit as an origin, uses the light incident surface of the screen unit as a plane on which an x-axis and a y-axis are located, uses the optical axis as a z-axis, and uses a direction of the z-axis as the direction in which the screen unit points to the projection unit, a function of the inner curved surface satisfies the following formula:

$$\begin{cases} h_1 = \alpha_1(r-r_1)^{Q_1}; r > r_1 \\ h_1(r) = 0; r \le r_1 \end{cases},$$

wherein $\alpha_1$ and $Q_1$ are optimization coefficients, $r_1$ is a radius of a circle in which an intersection line of the inner curved surface and the light incident surface is located, r is a distance between any one point on the inner curved surface and the optical axis of the projection unit, and $h_1$ is a distance between the any one point and the light incident surface of the screen unit; and a function of the outer curved surface satisfies the following formula:

$$\begin{cases} h_2 = \alpha_2(r-r_2)^{Q_2}; r > r_2 \\ h_2 = 0; r \le r_2 \end{cases},$$

wherein $\alpha_2$ and $Q_2$ are optimization coefficients, $r_2$ is a radius of a circle in which an intersection line of the outer curved surface and the light incident surface is located, r is a distance between any one point on the outer curved surface and the optical axis of the projection unit, and $h_2$ is a distance between the any one point and the light incident surface of the screen unit.

6. The projection system according to claim 2, wherein in a coordinate system that uses an intersection point of the optical axis of the projection unit and the screen unit as an origin, uses the light incident surface of the screen unit as a plane on which an x-axis and a y-axis are located, uses the optical axis as a z-axis, and uses a direction of the z-axis as the direction in which the screen unit points to the projection unit, a function of the inner curved surface satisfies the following formula:

$$h_1 = \sum_{n=0}^{N} \alpha_n r^n,$$

wherein $\alpha_n$ and N are optimization coefficients, r is a distance between any one point on the inner curved surface and the optical axis of the projection unit, and $h_1$ is a distance between the any one point and the light incident surface of the screen unit; and a function of the outer curved surface satisfies the following formula:

$$h_2 = \sum_{n=0}^{M} \beta_n r^n,$$

wherein $\beta_n$ and M are optimization coefficients, r is a distance between any one point on the outer curved surface and the optical axis of the projection unit, and $h_2$ is a distance between the any one point and the light incident surface of the screen unit.

7. The projection system according to claim 1, wherein the light transmission part is attached to the screen unit, a surface on which the light transmission part is attached to the screen unit is an attaching surface, an area in which the screen unit is attached to the attaching surface does not overlap with an edge area of the screen unit, and the edge area is a partial area of the merged area of the projection system.

8. The projection system according to claim 1, wherein the projection unit comprises a projector, a first reflector plate, and a second reflector plate, wherein the first reflector plate is configured to reflect, to the second reflector plate, light rays emitted by the projector, and the second reflector plate is configured to reflect, to the screen unit, the light rays reflected by the first reflector plate.

9. The projection system according to claim 1, wherein the light transmission part comprises an acrylic plastic or polystyrene plastic material, and the connecting part comprises an acrylic plastic or polystyrene plastic material.

10. The projection system according to claim 1, wherein the screen unit is a flat-surface screen unit or a curved-surface screen unit.

\* \* \* \* \*